Oct. 17, 1961     R. E. WARREN     3,004,700
TURBINE ENGINE CASING
Filed Aug. 18, 1959
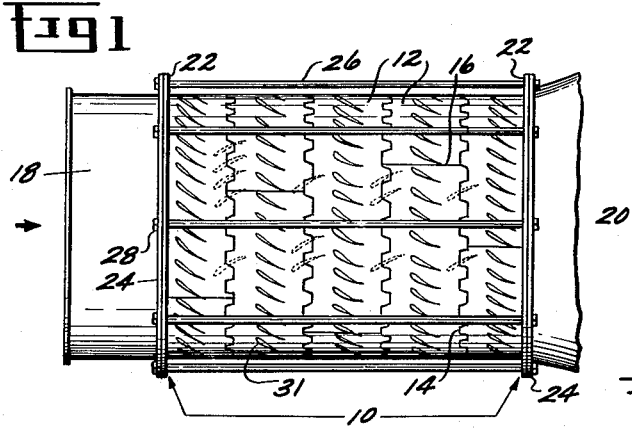
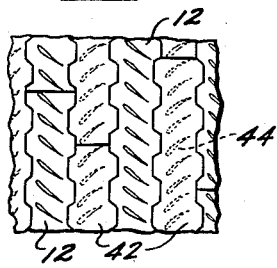
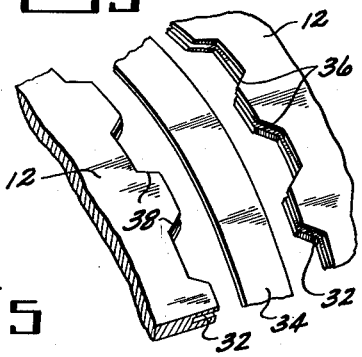
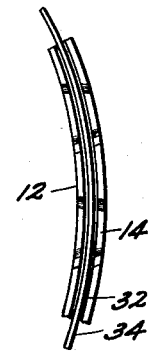
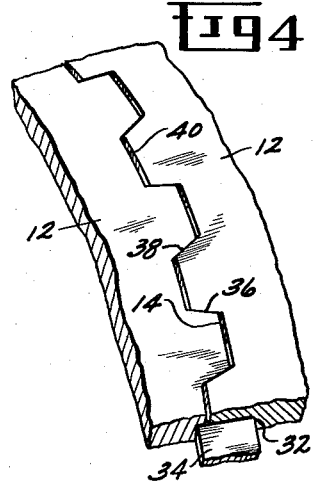
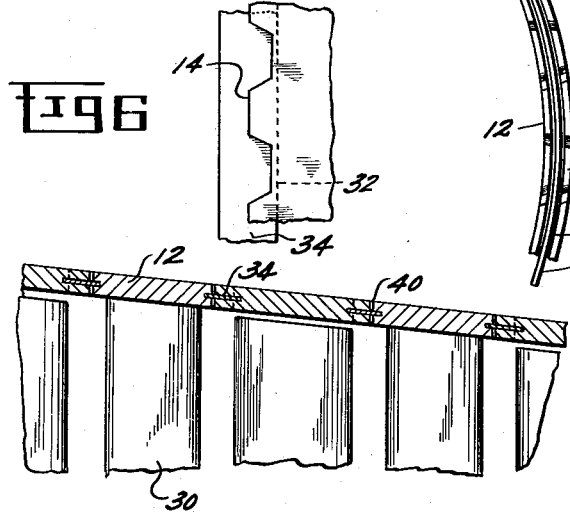
INVENTOR.
ROBERT E. WARREN
BY
Harry C. Burgess
ATTORNEY—

United States Patent Office 3,004,700
Patented Oct. 17, 1961

3,004,700
TURBINE ENGINE CASING
Robert Evans Warren, Marblehead, Mass., assignor to General Electric Company, a corporation of New York
Filed Aug. 18, 1959, Ser. No. 834,470
4 Claims. (Cl. 230—133)

This invention relates to an improvement in gas turbine engine construction and, more particularly, to an improvement in the construction of a casing for use in the compressor section of a relatively small axial-flow engine.

In large turbojet and turboshaft engines relatively complex structures are usually employed in constructing the static, as well as the rotating, parts of the engine compressor sections. For example, a typical large compressor casing may include a double-walled stator housing having an inner shroud designed to carry blading, and an outer shroud adapted to enclose and support the inner shroud. This type of construction usually requires a number of finely machined mating surfaces extending radially and axially of the casing, as well as circumferentially.

Although double-walled compressor casings may be preferable in engines of 4,000 horsepower and above, in the case of turbojet and turboshaft engines of relatively small diameter and relatively low horsepower, it would be desirable to simplify the construction and assembly procedures as much as possible in order to save weight and costs. In these smaller engines, with their lower compression ratios, sealing and blade assembly problems are not so likely to be as complex and it should therefore be possible to greatly simplify the compressor construction.

Accordingly, an object of this invention is to provide a simplified compressor casing assembly for use in a gas turbine engine having a relatively low compression ratio.

A further object of this invention is to provide a simplified, single-wall compressor casing construction particularly adapted for use in a relatively low horsepower and relatively low compression ratio axial-flow gas turbine engine, which construction is characterized by ease of assembly and relatively few parts.

Briefly stated, in one embodiment of my invention, I provide a gas turbine engine casing assembly built up of a plurality of abutting annular sections having face-toothed couplings at the forward and aft faces thereof, which annular sections contain slots for receiving blades, with means to rigidly secure the sections in a circumferential and end-to-end abutting relationship.

Other objects and advantages of my invention will become apparent from a reading of specification and claims, and from the following drawings wherein:

FIG. 1 is an exterior view of an assembled compressor casing utilizing the principle of my invention, and FIG. 2 is a pictorial view showing a plurality of radially-extending stator vanes attached to the annular sections of the simplified casing, and FIGS. 3 and 4 are exploded and assembly views, respectively, showing a pair of annular sections with means for sealing, and FIG. 5 is an end view of an annular section, taken along line 5—5 of FIG. 4, showing the radially-extending wedge shape of the section face teeth, and FIG. 6 is an elevation of an annular section showing the relationship between the depth of the sealing element slot and the face teeth, and FIG. 7 is a sectional view of a tapered compressor casing utilizing the principle of my invention, and FIG. 8 is a modification of the casing assembly utilizing a plurality of face-toothed spacer sections.

In FIG. 1, the invention is shown being utilized in the construction of a relatively small axial-flow gas turbine engine. The compressor casing assembly is indicated generally at 10 and comprises principally a series of annular sections or rings 12 having a number of wedge-shaped projections or teeth 14 on the forward and aft faces thereof. The teeth are adapted to interlock with similar teeth on adjacent sections, as can be seen by the drawing illustrating the sections in an assembled relationship. The casing assembly may also be constructed of complete sections, instead of the half-rings shown, in keeping with the spirit of my invention, although the latter are preferable for easier maintenance. The half-sections of each ring abut longitudinally at 16, the axially-extending joints being off-set (e.g., 90 degrees) between adjacent sections to better enable the interlocking wedge-shaped teeth 14 to carry the internal pressure loads.

The rings at each end of the casing assembly 10 contain means suitable for joining the assembly to the adjacent engine sections, e.g., a compressor inlet duct 18 and a combustor inlet duct 20. The joining means may comprise a pair of outwardly directed continuous flanges 22—22, such as are shown in the drawing, adapted to abut like flanges 24—24 on the aforementioned adjacent engine sections.

Suitable means are provided for rigidly securing the annular sections in a stacked array and for connecting the array to the compressor and combustor ducts. In the embodiment shown, the means comprises a plurality of axially-extending bolts 26 adapted to be received in holes in the duct and casing assembly flanges 24—24 and 22—22, respectively. Nuts 28 may then be used to tighten the stack and position it in the engine between the compressor and the combustor ducts.

FIG. 2 illustrates a plurality of inwardly directed stator vanes 30 being supported by an annular section 12. The stator vanes may be affixed to the section by any suitable method such as, for example, piercing the latter with the blades and then welding or brazing them at 31 to provide a gas tight seal.

It will be necessary for proper operating efficiency to insure that the casing assembly is leak-proof. Shown in FIG. 3 is one form of sealing means which may be utilized between adjacent annular sections. The means shown comprises a circumferential slot 32 in the interlocking face teeth of each section, which slot is adapted to receive a sealing element. The sealing element shown consists of a continuous resilient band 34 which, when cut into sections, may also be utilized in longitudinal slots provided in the edges of the annular sections indicated at 16. When positioned in the slots 32 the resilient band will extend below the roots of the teeth 14, as is best illustrated by FIGS. 4 and 6, to more completely insure against leakage. Obviously, any suitable method for preventing leakage, such as interlocking the edges, may be utilized in keeping with the spirit of my invention to seal the longitudinal joints at 16.

In addition to being tapered, or wedge-shaped, in an axial direction, the interlocking face teeth of adjacent annular sections have opposed radially convergent and divergent mating walls, i.e., the walls 36 on the aft face (it could equally be the forward face) of one section converge radially outward, whereas the walls 38 on the forward (or aft) face of the adjacent section converge radially inward. Therefore, when the annular sections are in an assembled relationship, the fact that the teeth 14 are wedge-shaped in two directions—radially and axially—helps them to better withstand the internal pressure loads. In other words, the outwardly-wedged teeth being interlocked with the inwardly-wedged teeth will help counteract the effects of radial expansion and prevent the loads from being carried solely by the slot and sealing element arrangement.

Referring again to FIG. 4, it will be noted that some clearance exists between the tip of each interlocking tooth and the adjacent ring section face, as is indicated at 40. Although not absolutely required, this clearance will help to insure a more perfect mating between the surfaces 36 and 38 of the abutting teeth, thus reducing the danger of out-of-round stresses in the casing assembly.

FIG. 7 illustrates a further embodiment of the invention wherein the casing has an axially tapered configuration, rather than the cylindrical shape appearing in FIG. 1. Both configurations have been found to be particularly suited for use in constructing a casing for the compressor section of an axial-flow gas turbine engine having a relatively small diameter, say, on the order of 8″ to 12″. The amount of change in diameter longitudinally of the tapered casing will, of course, be determined by the taper design within the bounds of a maximum and minimum diameter ratio.

FIG. 8 illustrates a further embodiment of the invention. Shown therein is a casing assembly employing a plurality of annular face-toothed spacer sections 42 which may be inserted between adjacent stator vane sections 12. The spacers are positioned directly opposite the rotor blades, indicated by the dotted lines 44, and serve as a shroud for these blades.

While the preferred embodiment of my invention has been described fully in order to explain its principles, it is to be understood that modifications of the structure may be made within the spirit of my invention and that it is not to be regarded as being limited to the exact details of the description, but may be utilized in other ways without departing from the scope of the invention as defined by the following claims.

I claim:

1. A gas turbine engine casing assembly comprising: a plurality of annular sections having forward and aft faces thereon; inwardly-directed vanes affixed to said sections; and means to rigidly align the sections in an abutting end-to-end relationship to form said casing assembly including a plurality of longitudinally wedge-shaped projections on said forward and aft faces, some of which projections are wedge-shaped in a radially-outward direction, with the remainder of said projections being wedge-shaped in a radially-inward direction, said projections being adapted to interlock with oppositely longitudinally and radially wedged projections in the faces of abutting annular sections to form a single-walled casing assembly, and retainers for rigidly maintaining said annular sections in said interlocking relationship.

2. In a compressor for an axial-flow gas turbine engine of relatively low compression ratio, a single-walled casing assembly including: a plurality of cylinders placed end-to-end, said cylinders having abutting forward and aft faces thereon; a plurality of inwardly-directed blades affixed to said cylinders; a plurality of longitudinally tapered teeth in the forward and aft faces of said cylinders, the teeth on at least one face of each of said cylinders also being tapered radially-outward for interlocking with radially-inward tapered teeth on the abutting face of an adjacent cylinder of said assembly; and sealing means carried in abutting faces of said cylinders to prevent gas leakage in said casing assembly.

3. In a compressor for an axial-flow gas turbine engine of relatively small diameter, a tapered single-walled casing assembly including: a plurality of tapered ring sections having different overall diameters, said sections having forward and aft faces thereon and being so constructed and arranged as to form said tapered assembly when said faces are placed in abutment; a plurality of inwardly-directed vanes affixed to said sections; a plurality of longitudinally tapered teeth in the forward and aft faces of said sections, the teeth on at least one face of each of said sections also being tapered radially outward for interlocking with radially inward tapered teeth on the abutting face of an adjacent section of said assembly; and sealing means carried in abutting faces of said sections to prevent gas leakage in said casing assembly.

4. For use in the compressor section of an axial flow gas turbine engine of relatively small diameter, a compressor casing assembly comprising: a plurality of solid half-rings adapted to abut each other along axial and circumferential faces thereof; a plurality of inwardly-directed vanes rigidly affixed to said half-rings; means to align said half-rings in said axial and circumferential abutting relationship including a plurality of longitudinally tapered projections in the forward and aft circumferential faces of said half-rings, the projections on one of the circumferential faces of each half-ring also being tapered radially-outward of the casing, the projections on the other of said circumferential faces of each half-ring being tapered radially-inward of the casing, the projections on both circumferential faces of each half-ring being adapted to interlock with oppositely-tapered projections on the abutting faces of adjacent half-rings when said half-rings are in an assembled relationship; and sealing means for said axial and circumferential faces including a plurality of resilient bands adapted to be inserted in grooves in said projections, and in said axial faces, said bands extending below the root line of the projections for sealing the casing assembly to internal gas pressures; and means to rigidly secure said half-rings in said aligned abutting relationship to form a single-walled casing assembly including flanges disposed at opposite ends of the assembly, said flanges having holes; and a plurality of axially-extending bolts adapted to be received in said holes for maintaining said half-rings in abutment.

References Cited in the file of this patent

UNITED STATES PATENTS

| | | |
|---|---|---|
| 2,445,661 | Constant et al. | July 20, 1948 |
| 2,510,606 | Price | June 6, 1950 |
| 2,638,743 | Feilden | May 19, 1953 |
| 2,716,563 | Seneschall | Aug. 30, 1955 |
| 2,722,373 | Ledwith, et al. | Nov. 1, 1955 |
| 2,741,454 | Eppley | Apr. 10, 1956 |
| 2,755,064 | Simonsen | July 17, 1956 |
| 2,765,114 | Chang | Oct. 2, 1956 |
| 2,766,963 | Zimmerman | Oct. 16, 1956 |
| 2,771,622 | Thorp | Nov. 27, 1956 |
| 2,801,075 | Broffitt | July 30, 1957 |

FOREIGN PATENTS

| | | |
|---|---|---|
| 660,383 | Great Britain | Nov. 7, 1951 |